(No Model.)

E. THOMSON.
FLUE FOR ELECTRIC TRANSFORMERS.

No. 387,123. Patented July 31, 1888.

Witnesses,
Ira R. Steward
O. K. Stuart

Inventor,
Elihu Thomson
By his Attorneys
Townsend & MacArthur

UNITED STATES PATENT OFFICE.

ELIHU THOMSON, OF LYNN, MASSACHUSETTS.

FLUE FOR ELECTRIC TRANSFORMERS.

SPECIFICATION forming part of Letters Patent No. 387,123, dated July 31, 1888.

Application filed June 9, 1888. Serial No. 276,649. (No model.)

*To all whom it may concern:*

Be it known that I, ELIHU THOMSON, a citizen of the United States, and a resident of Lynn, in the county of Essex and State of Massachusetts, have invented a certain new and useful Flue for Electric Transformers, of which the following is a specification.

My invention relates to those systems of electrical distribution in which electric transformers or converters are employed at the various local points where electrical energy is desired, and are supplied with current from a main distributing-line, which current, by means of the converter or transformer, is converted into electrical energy on an independent local circuit containing the electric lamps or other consumers of electrical energy.

My present invention is applicable not only to those cases where the electric transformers or converters consist of induction-coils supplied with alternating electric currents on a main circuit, but also to any form of electric converter supplied with current of any nature.

I have, for the sake of illustration, shown my invention applied to converters as used for alternating current systems of distribution.

It may sometimes occur in systems of distribution employing transformers that a partial short-circuit or other defect may occur in the transformer or converter, which will burn or char the insulation of its coils or otherwise damage the apparatus, and through the evolution of smoke and flame give rise to apprehension or alarm on the part of the occupants of the building with which the transformer is connected.

The object of my present invention is not only to install the apparatus under the best possible conditions of safety against fire or other disaster, but to remove any possible cause of apprehension or alarm at the point where the converter is located.

My invention consists, essentially, in the combination, with the converter or transformer, of a receptacle or casing surrounding the same, and a ventilating flue or passage connected with said casing and adapted to convey away any heated products of combustion arising from the presence of short-circuits in the apparatus or from other derangements of electrical conditions.

My invention is especially of value in connection with transformers or converters in the form of induction-coils, which may be liable to partial short circuits that will burn or char the insulation of its coils.

Figure 1:
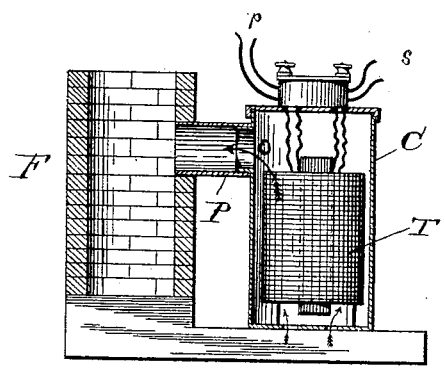
Figure 2:
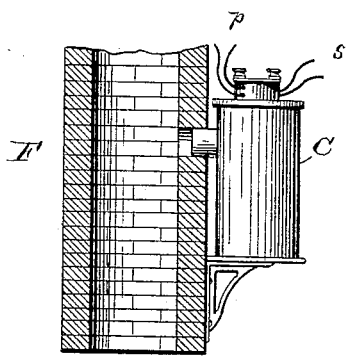
Figure 3:
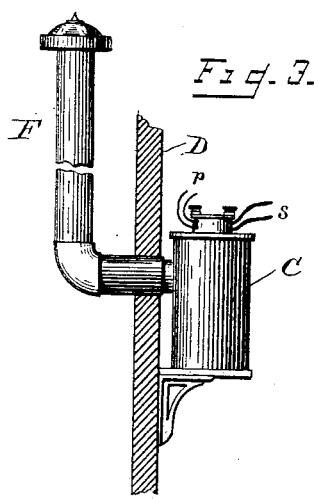
Figure 4:
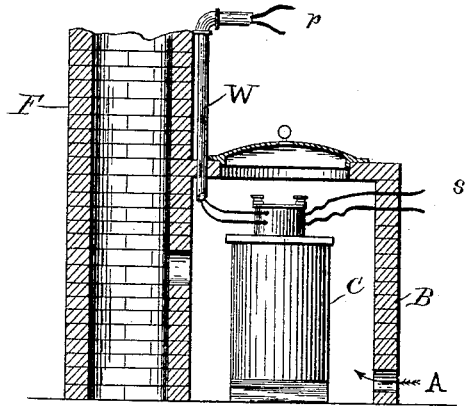

In the accompanying drawings, Figures 1 and 2 show in partial vertical section arrangements embodying my invention. Fig. 3 is a side elevation of a modification of the invention. Fig. 4 is a vertical section of a preferred arrangement.

Referring to Fig. 1, T indicates a transformer or converter in the form of an induction-coil, and *p* the terminals of said converter which connect with the supply-line, the terminals of the converter connecting with the local circuits within a building being indicated by the letter *s*.

C indicates a casing or shield of cast-iron or other suitable material, which surrounds the converter and is connected through an opening, O, in the casing with a ventilating flue, pipe, or chimney, F, such as ordinarily exists in the buildings in which the transformer or converter is located. The connection between the flue and the converter-casing may be either direct, as indicated in Fig. 2, or by means of an intermediate pipe, P, which is straight, as indicated, or may form a number of elbows or joints between the casing C and the flue.

The transformer-case may be either entirely closed, excepting at the opening O, or may have a number of small openings at or near its bottom to assist in the formation of a draft through the casing to the flue. With this arrangement, if any accident, due either to a defect in manufacture or to the presence of moisture or to other derangement, should occur, so as to short-circuit a part of the transformer, but not to a sufficient amount to cause a safety device ordinarily employed to act, the transformer may overheat and char its insulation, or may be otherwise damaged. In such case no apprehension or alarm will arise, since the passages provided to the flue will effectually carry away any smoke or heated products and prevent them from entering the building where they would be detected.

In the modification of my invention indicated in Fig. 2, the transformer-casing is supported upon a bracket against the wall and in proximity to the flue F.

In Fig. 3 an arrangement is indicated which may be resorted to when no flue exists in the building at the time of installation. In this case the transformer is connected by a suitable pipe leading outward to a flue, pipe, or chimney, F, erected for the occasion and serving as the carrier for removing smoke or charred products of combustion to the external atmosphere. The pipe, flue, or passage F may, indeed, be of quite small diameter, very much less than shown in the figures. The proportions shown are more adapted to cases in which a transformer is provided with additional openings at or near its bottom for producing a continuous ventilation through the casing. The objects of my invention, however, can be attained even when there are no additional openings provided, since the general leakage will be sufficient for carrying away the heat, smoke, or odor.

In the arrangement shown in Fig. 4 the transformer-casing consists of a receptacle built especially for the same, and formed, for instance, of brick or masonry. The leading-wires *p* connected with the line are carried through an iron pipe, W. An opening may be formed at A to allow the entrance of air for continuous ventilation, though this is not essential. By providing, however, for a continuous ventilation the temperature of the transformer may be kept down should there be any tendency to detrimental heating while the same is in use.

What I claim as my invention is—

1. The combination, with a transformer placed in a building, of a ventilating flue or pipe leading to the external atmosphere, and a casing surrounding the transformer and connected with said flue.

2. In a system of electrical distribution by alternating currents, an alternating-current transformer having a casing connected with a flue or passage through which any heated products of combustion may escape to the external atmosphere.

3. In a system of electrical distribution, a transformer provided with a casing connected with a flue, and openings at or near the bottom of said casing for inducing a ventilating and cooling current of air through the casing around the induction-coil and to the escape-flue.

4. In a system of electrical distribution employing electric transformers or converters, a casing or receptacle built around the transformer within the building where the transformer is located, and a passage from said casing to a ventilating flue or chimney, as and for the purpose described.

Signed at Lynn, in the county of Essex and State of Massachusetts, this 21st day of May, A. D. 1888.

ELIHU THOMSON.

Witnesses:
J. W. GIBBONEY,
A. L. ROHRER.